US 012222274B2

(12) United States Patent
Masset

(10) Patent No.: US 12,222,274 B2
(45) Date of Patent: Feb. 11, 2025

(54) CALIBRATED AEROSOL SOURCE AND RELATED METHODS

(71) Applicant: HAMILTON ASSOCIATES, INC., Owings Mills, MD (US)

(72) Inventor: Sylvain Masset, Baltimore, MD (US)

(73) Assignee: HAMILTON ASSOCIATES, INC., Owings Mills, MD (US)

( * ) Notice: Subject to any disclaimer, the term of this patent is extended or adjusted under 35 U.S.C. 154(b) by 392 days.

(21) Appl. No.: 17/724,294

(22) Filed: Apr. 19, 2022

(65) Prior Publication Data

US 2023/0332997 A1    Oct. 19, 2023

(51) Int. Cl.
    *G01N 15/10*    (2024.01)

(52) U.S. Cl.
    CPC .  *G01N 15/1012* (2013.01); *G01N 2015/1016* (2024.01); *G01N 2015/1029* (2024.01)

(58) Field of Classification Search
    CPC .............................................. G01N 2015/1016
    See application file for complete search history.

(56) References Cited

U.S. PATENT DOCUMENTS

| 4,269,057 A | * | 5/1981 | Ong | G01N 33/0006 73/1.03 |
| 5,087,389 A | * | 2/1992 | Carlon | C09K 3/30 73/40 |
| 5,156,776 A | * | 10/1992 | Loedding | B01F 23/12 261/78.2 |
| 5,728,927 A | * | 3/1998 | Ong | G01N 33/007 73/1.02 |
| 7,694,548 B2 | | 4/2010 | Masset et al. | |

FOREIGN PATENT DOCUMENTS

| CN | 204882500 | 12/2015 |
| CN | 106226483 | 12/2016 |
| CN | 109772188 | 5/2019 |

OTHER PUBLICATIONS

Machine generated translation of CN109772188 (22 pages).
Extended European Search Report dated Jun. 19, 2023 issued in connection with European Patent Application No. 22196773.0.
Machine generated translation of CN106226483.

* cited by examiner

*Primary Examiner* — Daniel S Larkin
(74) *Attorney, Agent, or Firm* — Merek, Blackmon & Voorhees, LLC

(57) ABSTRACT

A calibrated aerosol source ("CAS") and related methods for parameterizing, testing, troubleshooting and/or calibrating an instrument (e.g., photometers) or a system. Preferably, the CAS allows for generation of multiple concentrations while maintaining constant particle size distribution (PSD) for all aerosol concentrations, so that the aerosol response at other points in a particular range can be verified and linearity that was previously assumed can be proved.

20 Claims, 12 Drawing Sheets

CALIBRATED AEROSOL SOURCE AND RELATED METHODS

FIELD OF INVENTION

This invention pertains generally to devices and methods for parameterizing, testing, troubleshooting and/or calibrating an instrument (e.g., photometers) or a system. A preferred embodiment of the present invention is directed to a calibrated aerosol source ("CAS") which is a system used to generate a controlled aerosol, which in turn can be used to parameterize, test, troubleshoot and/or calibrate aerosol photometers or other instruments or systems. The CAS of a preferred embodiment of the present invention allows for generation of multiple concentrations below an upper concentration (e.g., 100 µg/L (microgram/liter)), so that the aerosol response at other points in a particular range can be verified and linearity that was previously assumed can be proved.

BACKGROUND OF INVENTION

Devices and methods for calibrating aerosol photometers are known including those used to calibrate lower concentrations of aerosol. For example, such devices employ mechanical diluters that will dilute and thus reduce the concentration of an aerosol stream. However, such devices change the particle size distribution ("PSD") of the test aerosol.

This is problematic because when you calibrate a photometer against a gravimetric measurement performed on the calibration device, the aerosol you are using has a certain PSD when you set the specific calibration point, for example, 100 µg/L. If the PSD changes, even if the gravimetric mass of the aerosol is the same, it will measure differently when it is read by a photometer. Therefore, to achieve an "apples-to-apples" comparison to verify that a particular photometer is still linear at lower concentrations, the concentration must be reduced in such a way that it does not change/alter the PSD. Prior known devices for calibrating photometers have not been able to maintain constant the PSD over the range of concentrations.

Therefore, there exists an immediate need for a calibration device that maintains constant the PSD even at lower concentrations of aerosol evaluating instruments and or system including but not limited to parameterizing, testing, troubleshooting and/or calibrating instruments (e.g., photometers) or systems.

OBJECTS AND SUMMARY OF THE INVENTION

An object of one or more preferred embodiments of the present invention is to provide novel and unobvious methods, apparatuses, and systems for parameterizing, testing, troubleshooting and/or calibrating an instrument (e.g., photometers) or a system while maintaining constant the particle size distribution (PSD) of a test aerosol over numerous test aerosol ratios (i.e., a ratio between a lower aerosol test concentration and a higher aerosol test concentration) including ratios above and below a ratio of 100:1.

Another object of one or more one preferred embodiments is to provide methods, apparatus and systems for maintaining the oil level (e.g., PAO or DOP) of one or more aerosol generators at a particular height (e.g., at a particular height above a portion of a Laskin nozzle or atomizer or any other suitable aerosol generating component) to prevent a change in particle size distribution (PSD) when the concentration of the aerosol is changed or lowered.

A further object of one or more preferred embodiments is to provide a back pressure plate in one or more mixing chambers creating a positive pressure in the one or more mixing chambers to force the aerosol out of a given mixing chamber without mechanical or other means (e.g., a pump) that can or will alter the PSD of the aerosol supplied to an instrument to be tested.

Another object of one or more preferred embodiments is to provide a pressure controller to maintain the pressure supplied to and/or in the aerosol generator or generators constant.

Still another object of one or more preferred embodiments is to maintain a positive pressure of one or two inches of water column or 0.036 to 0.072 PSI in one or more mixing chambers to force aerosol out of the corresponding mixing chamber to obviate the need for a mechanical device or other means (e.g., a pump) that can or will alter the PSD of the aerosol.

Yet another object of one or more preferred embodiments is to maintain a positive pressure (e.g., one or two inches of water column or 0.036 to 0.072 PSI) in one or more mixing chambers to obviate the need for a mechanical device to force aerosol out of the corresponding mixing chamber by providing a back pressure plate in the one or mixing chambers to have a plurality of openings in a grid configuration and operating a fan at a specific rate to ensure the desired positive pressure in a given mixing chamber.

Yet still a further object of one or more preferred embodiments is to provide a fan filter unit decoupled or spaced from the primary mixing chamber and/or the secondary mixing chamber so that an internal pressure of a corresponding mixing chamber is not affected by loading of one or more filters of the fan filter unit.

Still another object of one or more preferred embodiments is to provide each aerosol generator with a suitable aerosol generating device or member (e.g., quarter Laskin nozzle, i.e., a Laskin nozzle having a single opening in a sidewall of a nozzle tube and a single opening in a collar of the Laskin nozzle or an atomizer or other suitable aerosol generating device or member) configured to maintain PSD constant regardless of whether the particle distribution is a Laskin distribution or other distribution corresponding to a component other than a Laskin nozzle.

A further object of one or more preferred embodiments is to provide stacked and vertically aligned T-connectors one for each of on/off valves (most preferably three stacked T-connectors and three on/off valves) connecting the secondary mixing chamber to the primary mixing chamber and a source of dilution air to allow dilution air to be supplied through the stacked and vertically aligned T-connectors to the secondary mixing chamber even when one or more of the on/off valves are in the off or aerosol sealed position.

Still a further object of one or more preferred embodiments is to provide a test aerosol having a concertation ranging from 0.1 µg/L to over 100 µg/L without altering PSD.

A preferred embodiment of the present invention is directed to a method including the step of providing a calibrated aerosol source for generating at least one test aerosol at a plurality of different aerosol concentrations, the calibrated aerosol source including at least one aerosol generator, a primary mixing chamber and a secondary mixing chamber. A first test port is operably connected to the primary mixing chamber. The first test port is configured such that an instrument or system to be evaluated can be connected to the first test port. A second test port is operably connected to the secondary mixing chamber. The second test port is configured such that an instrument or system to be evaluated can be connected to said second test port. The method further includes the step of providing the calibrated aerosol source with at least one of the following: (i) a liquid flow control assembly configured to maintain a liquid level in the at least one aerosol generator at a predetermined height; (ii) a pressure controller for precisely controlling pressure of compressed air supplied to the at least one aerosol generator; and, (iii) one or more back pressure plates for maintaining a positive pressure in one or both of the primary mixing chamber and said secondary mixing chamber.

Another preferred embodiment of the present invention is directed to an apparatus including a calibrated aerosol source for generating at least one test aerosol at a plurality of different aerosol concentrations. The calibrated aerosol source includes at least one aerosol generator, a primary mixing chamber and a secondary mixing chamber. A first test port is operably connected to the primary mixing chamber. The first test port is configured such that an instrument or system to be evaluated can be connected to the first test port. A second test port is operably connected to the secondary mixing chamber. The second test port is configured such that an instrument or system to be evaluated can be connected to the second test port. The calibrated aerosol source has at least one of the following: (i) a liquid flow control assembly configured to maintain a liquid level in the at least one aerosol generator at a predetermined height; (ii) a pressure controller for precisely controlling pressure of compressed air supplied to the at least one aerosol generator; and, (iii) at least one of the primary mixing chamber and the secondary mixing chamber having a back pressure plate for maintaining a positive pressure in a corresponding mixing chamber.

A further preferred embodiment of the present invention is directed to apparatus for calibrating an instrument including a calibrated aerosol source for generating at least one test aerosol at a plurality of different aerosol concentrations. The calibrated aerosol source includes at least one aerosol generator, a primary mixing chamber and a secondary mixing chamber. The first test port is operably connected to the primary mixing chamber and is configured such that an instrument to be calibrated (e.g., photometer) can be connected to the first test port. A second test port is operably connected to the secondary mixing chamber. The second test port is configured such that an instrument to be calibrated can be connected to the second test port. The calibrated aerosol source having each of the following: (i) a liquid flow control assembly configured to maintain a liquid level in the at least one aerosol generator at approximately one +inch above an upper surface of an annular collar of a Laskin nozzle; (ii) a pressure controller for precisely controlling pressure of compressed air supplied to the at least one aerosol generator so that when using PAO compressed air pressure is maintained at 23 psi and when using DOP compressed air pressure is maintained at 20 psi; and, (iii) at least one of the primary mixing chamber and the secondary mixing chamber having a back pressure plate for maintaining a positive pressure in a corresponding mixing chamber.

The above objects of the invention and summaries describe preferred forms of the present invention and are not in any way to be construed as limiting the claimed invention to the preferred forms or any object recited above.

DETAILED DESCRIPTION OF THE PREFERRED EMBODIMENTS OF THE INVENTION

Figure 1:
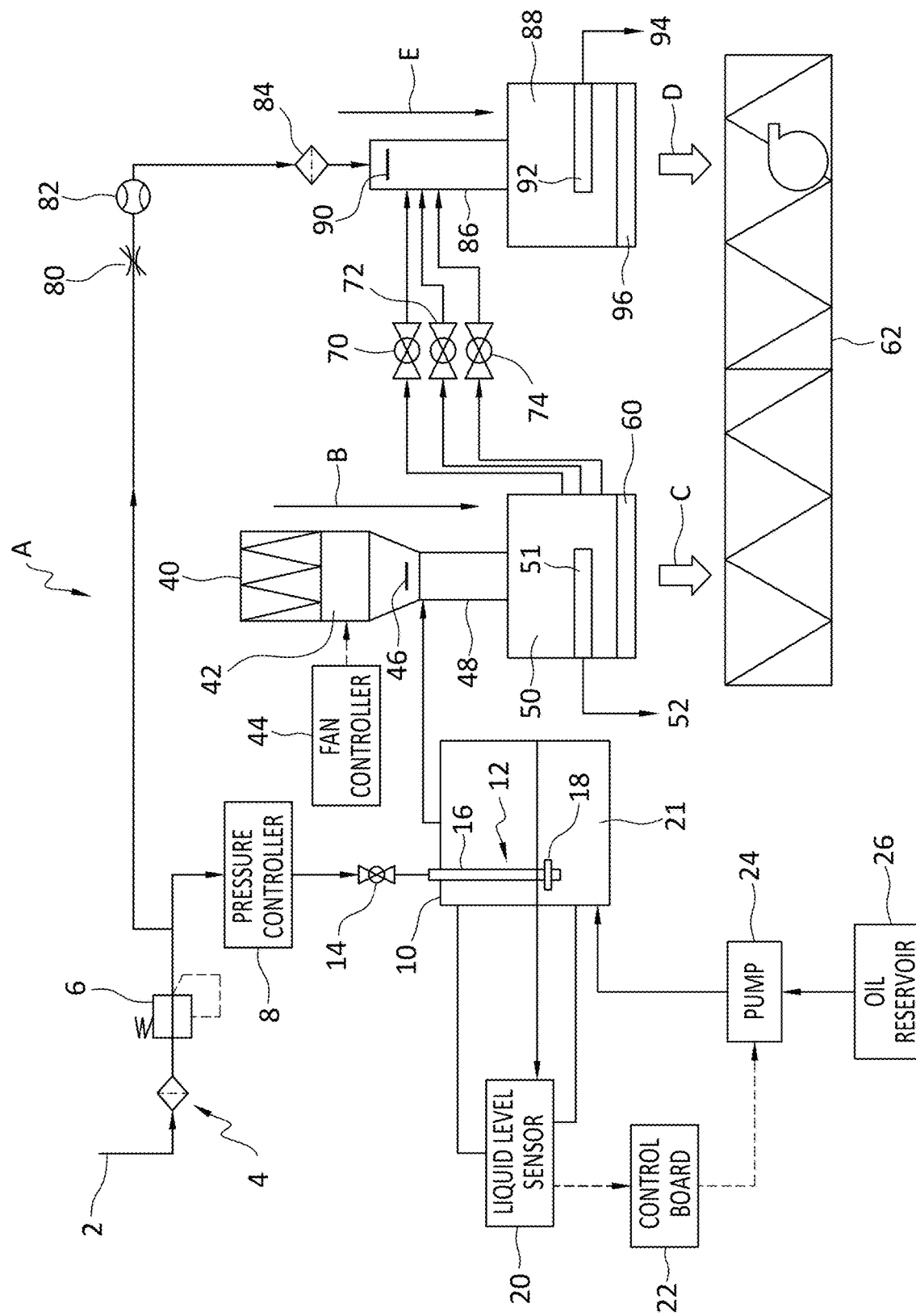
FIG. 1 is a schematic diagram of a preferred embodiment of a calibrated aerosol source.

The preferred forms of the presented invention will now be described with reference to FIGS. 1-15. The appended claims are not limited to the preferred forms and no term and/or phrase used herein is to be given a meaning other than its ordinary meaning unless it is expressly stated otherwise.

The present invention is directed to methods, apparatuses, and systems for parameterizing, testing, troubleshooting and/or calibrating an instrument (e.g., photometers) or a system while maintaining constant the particle size distribution (PSD) of a test aerosol over numerous test aerosol ratios (i.e., a ratio between a lower aerosol test concentration and a higher aerosol test concentration) including ratios above and below a ratio of 100:1.

The preferred forms of the present invention relate to enhanced methods, apparatuses and systems for calibrating aerosol photometers. A preferred embodiment of the present invention is directed to a calibrated aerosol source ("CAS") configured to generate a controlled aerosol, which in turn is used to calibrate aerosol photometers. The CAS of a preferred embodiment of the present invention allows for generation of multiple concentrations of aerosol including 100 μg/L (microgram/liter) and numerous ranges of concentrations below 100 μg/L, so that the aerosol response at other points in a particular range can be verified and linearity that was previously assumed can be proved.

The lower aerosol concentration ranges can include a first aerosol concentration range of 0.1 μg/L to 5 μg/L, a second aerosol concentration range of 5 μg/L to 30 μg/L and a third aerosol concentration range of 30 μg/L to 60 μg/L. Preferably, a plurality of valves and control of the dilution air allows each increment in the first, second and third ranges to be achieved including but not limited to the lower and upper limits of each range, i.e., a range as used herein includes the lower limit and the upper limit as well as all intermediate values therebetween.

The CAS may include one, two or more than two aerosol generators for generating a test aerosol. In the most preferred form, two aerosol generators are employed one having PAO (Poly Alfa Olefin) as the liquid from which a test aerosol is produced and the other having DOP (Dioctyl Phthalate) as the liquid from which a test aerosol is produced to allow the user to readily select from PAO or DOP based test aerosols.

The preferred CAS achieves all aerosol concentrations including but not limited to the lower aerosol concentrations while maintaining constant the particle size distribution ("PSD"). To maintain constant the PSD, the preferred CAS: (i) closely monitors and maintains the liquid level in the one or more aerosol generators at a predetermined level or height (e.g., a predetermined level or height above a vertically extending through hole formed in an annular collar (most preferably one inch of a quarter Laskin nozzle), (ii) creating a positive pressure in the primary mixing chamber solely by a back pressure plate and a fan controller which controls the speed of the fan; and/or (iii) a pressure controller that precisely controls the pressure of compressed air delivered to and in one or more aerosol generators. A flow meter may also be used to monitor air flow and provide air flow readings to a PLC or other computer components to more control the speed of the fan based on the air flow readings to achieve the desired positive pressure in the primary mixing chamber.

Depending on the particular application, one, two or all of these features can be used to maintain constant PSD even at lower aerosol concentrations. Other features of the preferred forms of the present invention described herein can also contribute to maintaining constant PSD even at lower aerosol concentrations including but not limited to decoupling the fan filter from the primary mixing chamber and/or the secondary mixing chamber.

FIG. 1 is a schematic of a calibrated aerosol source ("CAS") A formed in accordance with a preferred embodiment of the present invention. CAS A includes an air inlet 2 for receiving compressed air from a source of compressed air (not shown) connected to CAS A. The compressed air passes through one or more filters 4. In a preferred embodiment, as seen in FIG. 2, CAS A includes a compressed air conditioning system preferably having filters 4A, 4B and 4C connected in series and a dryer 5.

Compressed air from the external source of compressed air (i.e., the source of compressed air is a component external to CAS A but connected thereto to supply compressed air to CAS A), passes through each of filters 4A, 4B and 4C and dryer 5. An outlet of the compressed air conditioning system (e.g., an outlet of dryer 5) is connected to regulator 6 which regulates or controls the pressure of the compressed air. It should be noted that the components of the compressed air conditioning system can be readily varied as desired.

Figure 2:
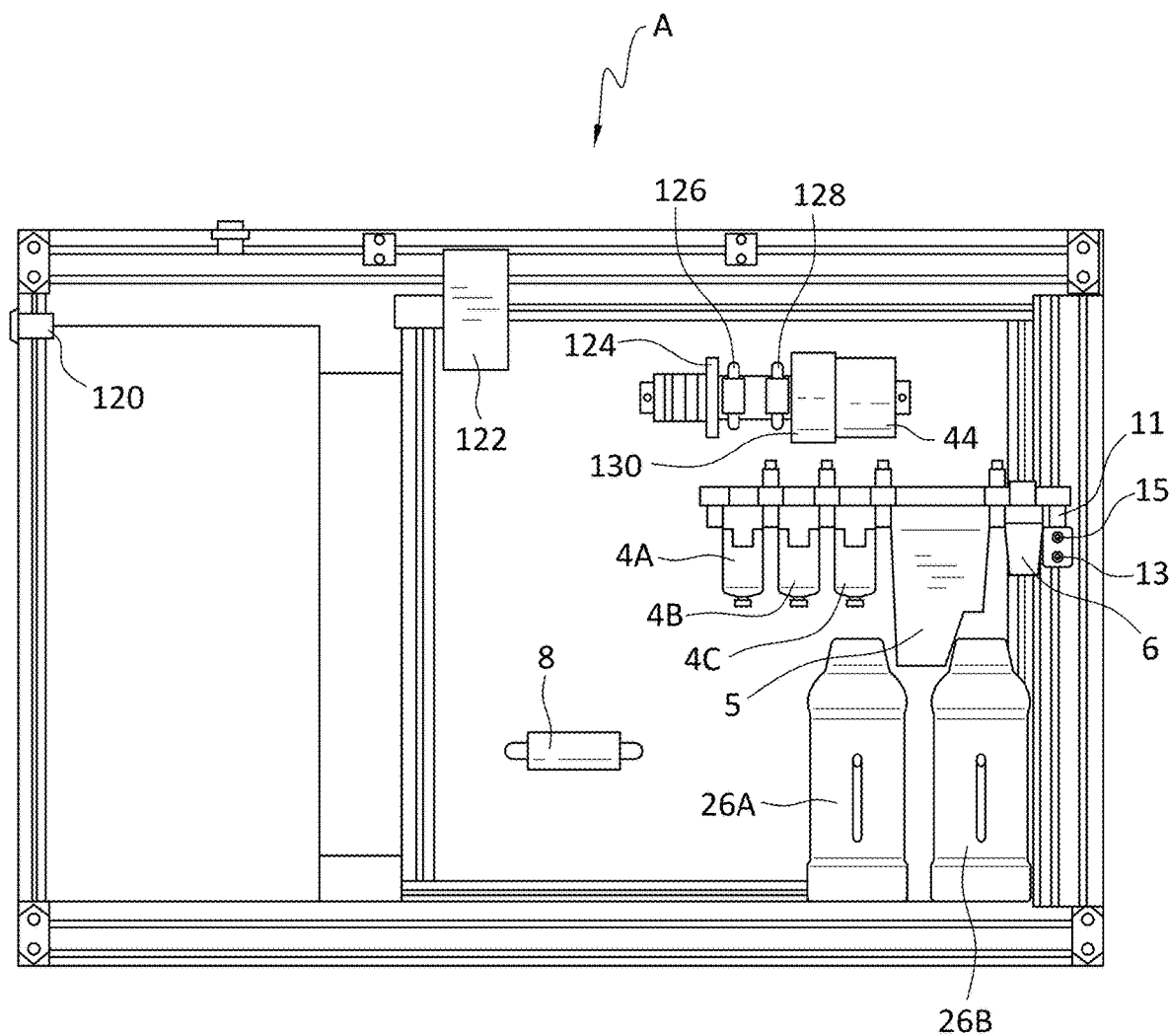
FIG. 2 is an elevational view of portions of a preferred embodiment of a calibrated aerosol source with portions removed so that particular components can be readily viewed.

The outlet of regulator 6 is preferably connected to two separate portions of CAS A, the first of which is pressure controller 8 and aerosol generator 10 by way of connector 11 (as shown in FIG. 2) having an inlet port and two outlet ports 13 and 15 one of which is connected to an inlet port of pressure controller 8. Pressure controller 8 precisely controls the pressure of compressed air directed to and in aerosol generator 10 by way of Laskin nozzle 12.

Pressure controller 8 can, for example, be an Alicat pressure controller (e.g., PCP-30PSIG-RD/5P, RIN, 5IN, P1: 50 PSIG, P2: 23 PSIG). However, any suitable pressure controller can be used that allows for the precise control of the pressure of compressed air directed to and in the aerosol generator 10. CAS A can include one, two or more aerosol generators.

For example, CAS A, as seen in FIGS. 3, 8, 9, 13 and 14 can include two aerosol generators 10A and 10B one having PAO (Poly Alfa Olefin) as the liquid chemical used to produce the test aerosol and the other having DOP (Dioctyl Phthalate) as the liquid chemical used to produce the test aerosol. Aerosol generator 10A preferably includes Laskin nozzle 12A and aerosol generator 10B preferably includes Laskin nozzle 12B, which will provide a Laskin distribution. However, it is to be understood that any suitable aerosol generating component other than Laskin nozzles providing Laskin distribution can be used including but not limited to atomizers providing distributions other than Laskin distributions.

A manifold or other connector can be used to connect the outlet of pressure controller 8 to aerosol generators 10A and 10B. Alternatively, a separate pressure controller can be provided for each aerosol generator. An on/off valve 14 or other flow control member is preferably associated with each of the multiple aerosol generators to allow a user to select a particular test aerosol produced from a particular liquid chemical. Where the test aerosol is produced using PAO, pressure controller 8 is configured and/or operated to maintain the pressure of compressed air at 23 psi in generator 10 and where the test aerosol is produced using DOP, pressure controller 8 is configured and/or operated to maintain the pressure of compressed air at 20 psi in generator 10. However, it is to be understood that other liquids (i.e., liquids other than PAO or DOP) can be used from which the test aerosol is generated. For liquid other than PAO and DOP, a preferred form of the present invention allows for the pressure of compressed air directed to and/or in the corresponding aerosol generator to be varied to achieve a specific pressure for the specific liquid used to maintain PSD constant.

Compressed air from pressure controller 8 passes through valve 14 when valve 14 is open and is directed into hollow nozzle tube 16 of Laskin nozzle 12. Referring to FIG. 4, one opening 17 is formed in the side wall of nozzle tube 16 below collar 18 of Laskin nozzle 12 so that air escapes from nozzle tube 12 at a high velocity. Collar 18 includes a through hole 19 extending parallel to nozzle tube 16 adjacent opening 17 formed in the sidewall of nozzle tube 16.

The high velocity air escaping through opening 17 pulls the liquid 21 (e.g., PAO or DOP) in aerosol generator 10 through the vertically extending through hole 19 in collar 18. By this flow through the Laskin nozzle 12, the liquid is finely atomized into gas bubbles that move upwardly toward the liquid surface where they burst creating small particles that are transferred into the outgoing air stream of aerosol generator 10.

Typically, Laskin nozzles have eight holes, four of which are formed in the sidewall of the nozzle tube and four of which are formed in the collar. Therefore, nozzle 12 of a preferred embodiment of the present invention is a quarter Laskin nozzle having only two holes, one in the sidewall of nozzle tube 16 and the other extending vertically through collar 18.

CAS A further includes liquid level sensor 20, control board or member 22, pump 24 and oil reservoir or container 26 (e.g., reservoir containing PAO or DOP). The control board or member 22 is configured to operate pump 24 to fill or refill liquid in generator 10 based on readings/input from liquid level sensor 20 so as to maintain the liquid level in generator 10 at a particular distance above an uppermost portion of through hole 19 extending vertically through collar 18 of nozzle 12. Preferably, the liquid level is maintained at one inch above the upper horizontally extending surface 28 of collar 18.

Figure 3:
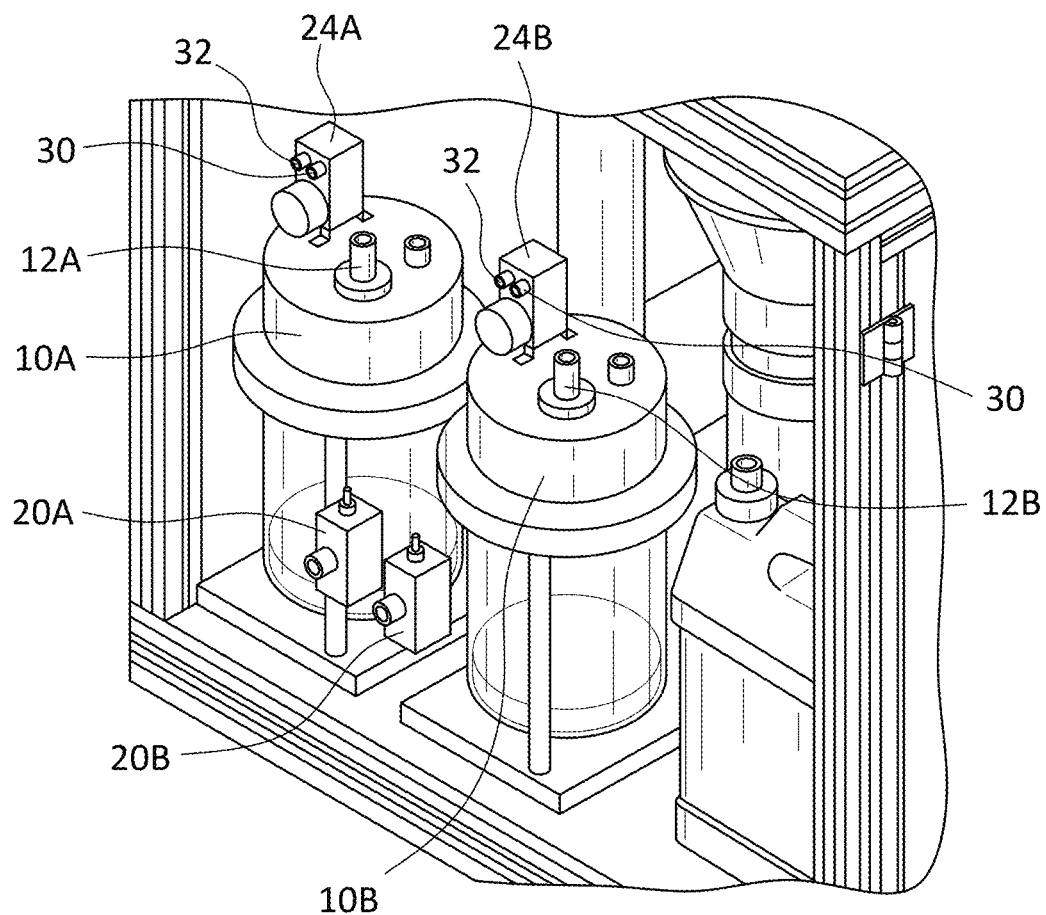
FIG. 3 is a fragmentary perspective view of portions of a preferred embodiment of a calibrated aerosol source with portions removed so that particular components can be readily viewed.
Figure 4:
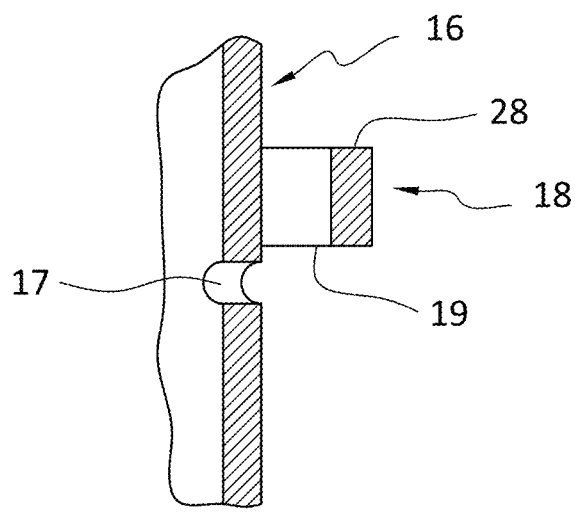
FIG. 4 is a fragmentary cross-sectional view of a lower portion of a preferred aerosol nozzle.
Figure 8:
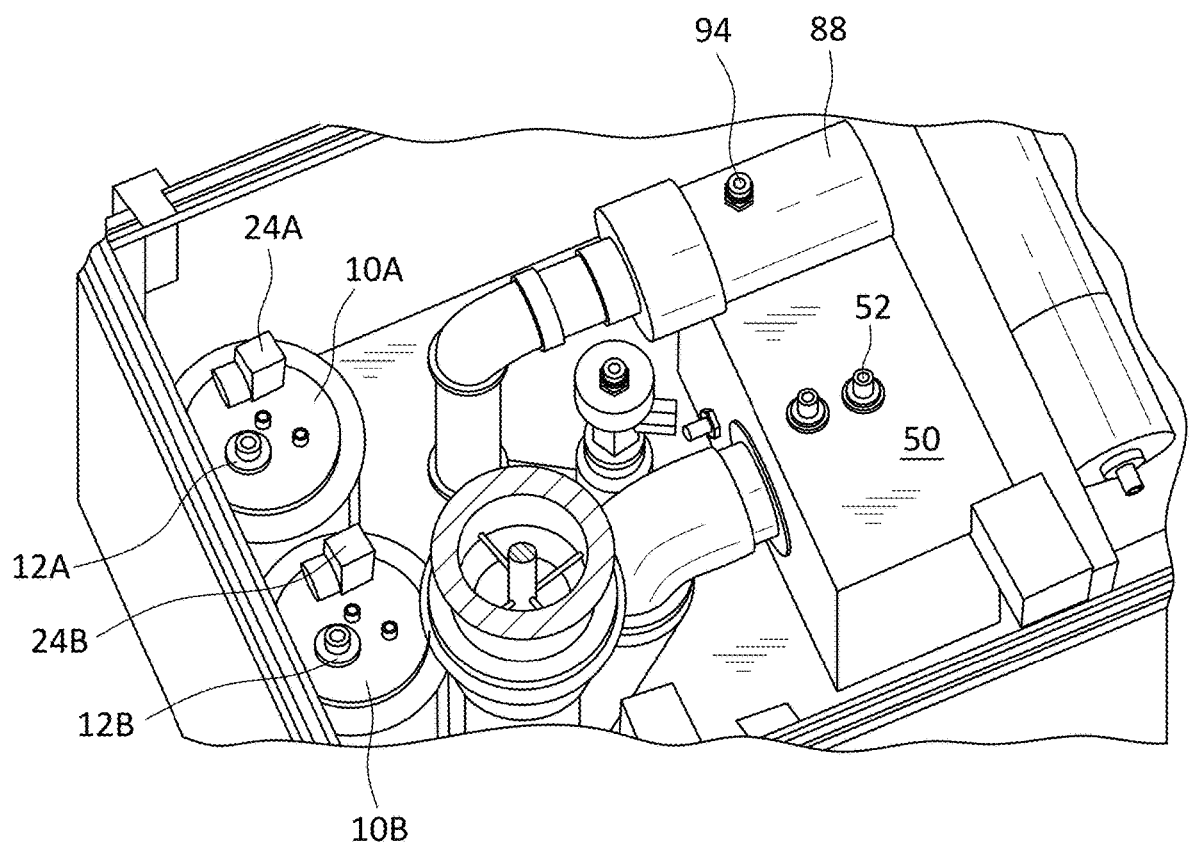
FIG. 8 is a fragmentary perspective view of portions of a preferred embodiment of a calibrated aerosol source with portions removed so that particular components can be readily viewed.
Figure 9:
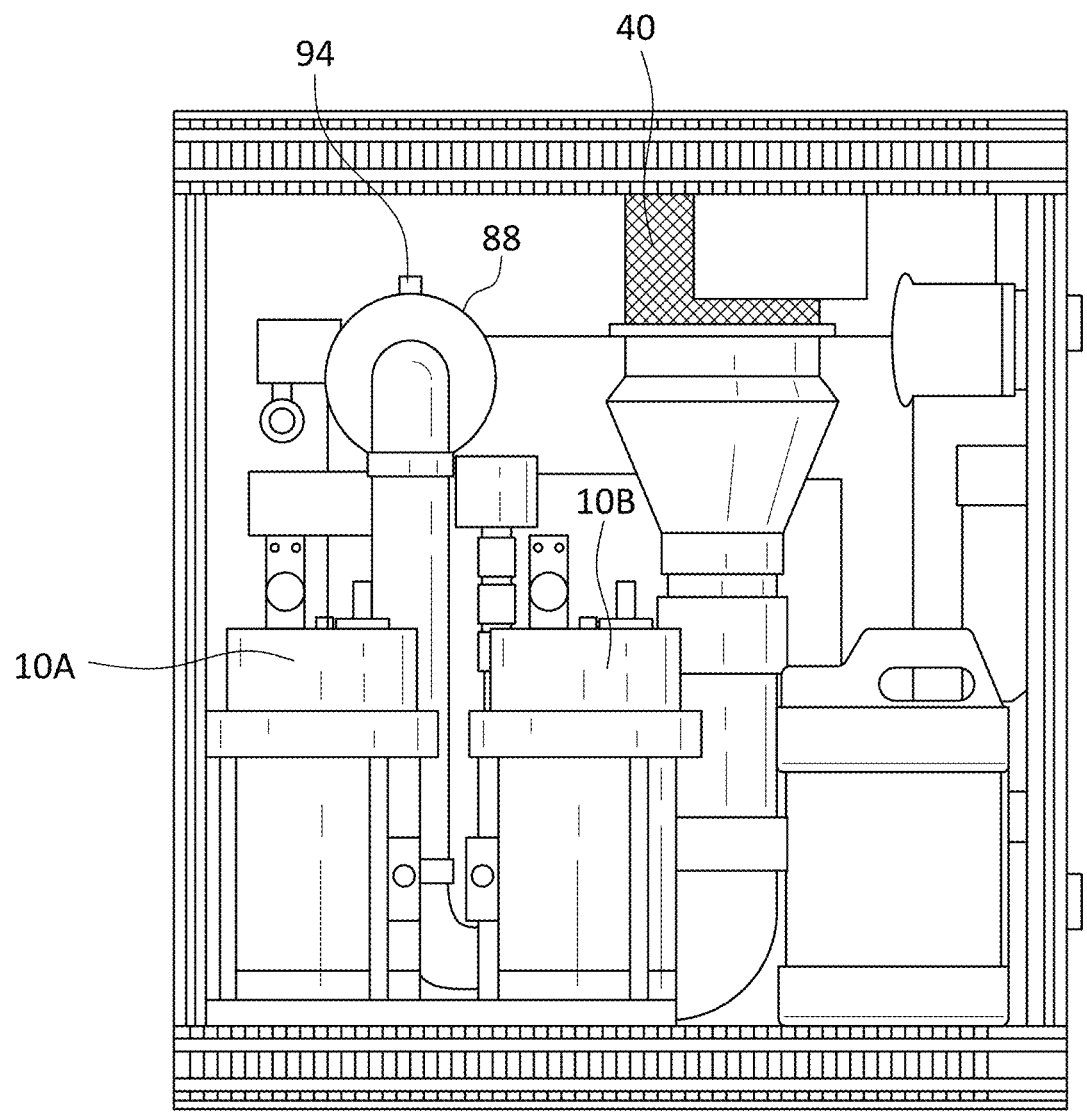
FIG. 9 is an elevational view of portions of a preferred embodiment of a calibrated aerosol source with portions removed so that particular components can be readily viewed.

As seen in, for example, FIGS. 3 and 8, pump 24A is mounted on generator 10A and pump 24B is mounted on generator 10B. Each pump includes inlet port 30 and outlet port 32. The inlet port 30 of each pump is connected to a corresponding oil reservoir by one or more conduits (not shown) and the outlet port 32 is connected to a bottom or lower portion of the corresponding aerosol generator by one or more conduits (not shown).

As seen in FIG. 2, oil storage containers or reservoirs 26A and 26B are provided for containing or housing two different liquids (e.g., PAO and DOP). An outlet of reservoir 26A is connected to an inlet port 30 of pump 24A and an outlet of reservoir 26B is connected to an inlet port 30 of pump 24B. Further, as shown in FIG. 3, level sensor 20A is operably connected to generator 10A to precisely measure the level of liquid in generator 10A and level sensor 20B is operably connected to generator 10B to precisely measure the level of liquid in generator 10B.

Referring to FIGS. 1, 5 to 7 and 11, the output of generator 10 is directed to the main aerosol mixing branch which includes HEPA filter 40, fan 42, fan controller 44, mixing plate 46 (e.g., Stairmand disk) housed in a conduit 48 connecting the HEPA filter 40 and fan 42 to primary mixing chamber 50. The mixing plate 46 is positioned above the point at which aerosol from aerosol generator 10 enters conduit 48. Primary mixing chamber 50 includes a sample port 52 (see, for example, FIG. 6) connected to a sampling tube 51 (see, for example, FIG. 11) disposed in chamber 50.

Figure 10:
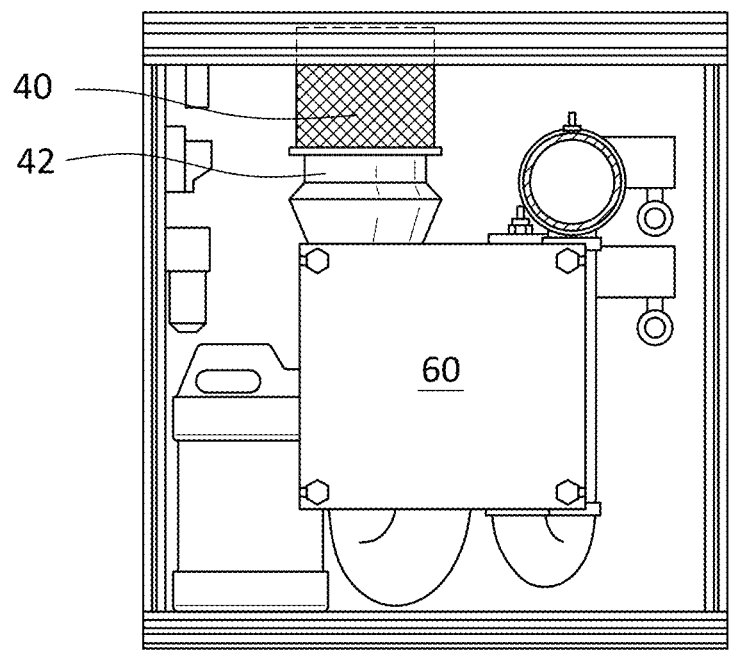
FIG. 10 is an elevational view of portions of a preferred embodiment of a calibrated aerosol source with portions removed so that particular components can be readily viewed.
Figure 11:
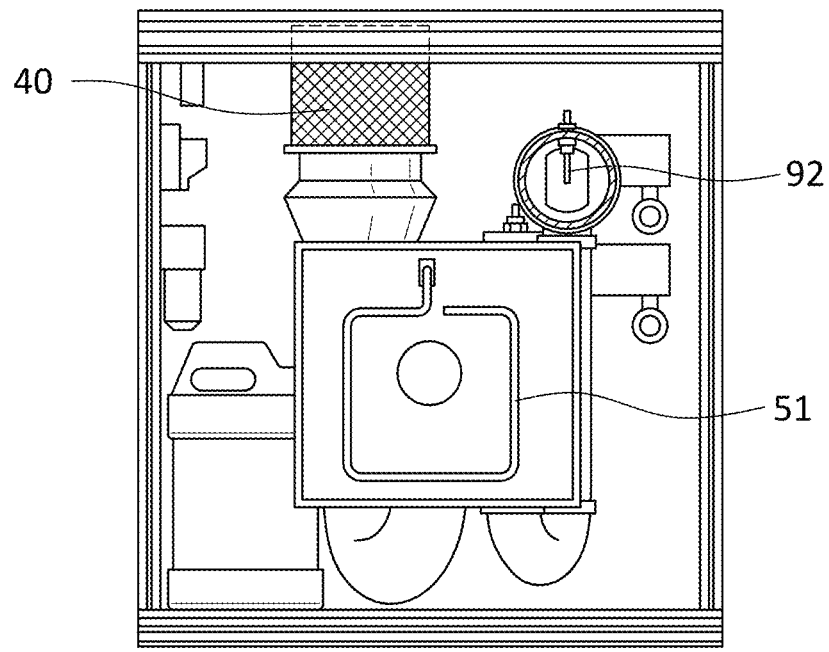
FIG. 11 is an elevational view of portions of a preferred embodiment of a calibrated aerosol source with portions removed so that particular components can be readily viewed.
Figure 12:
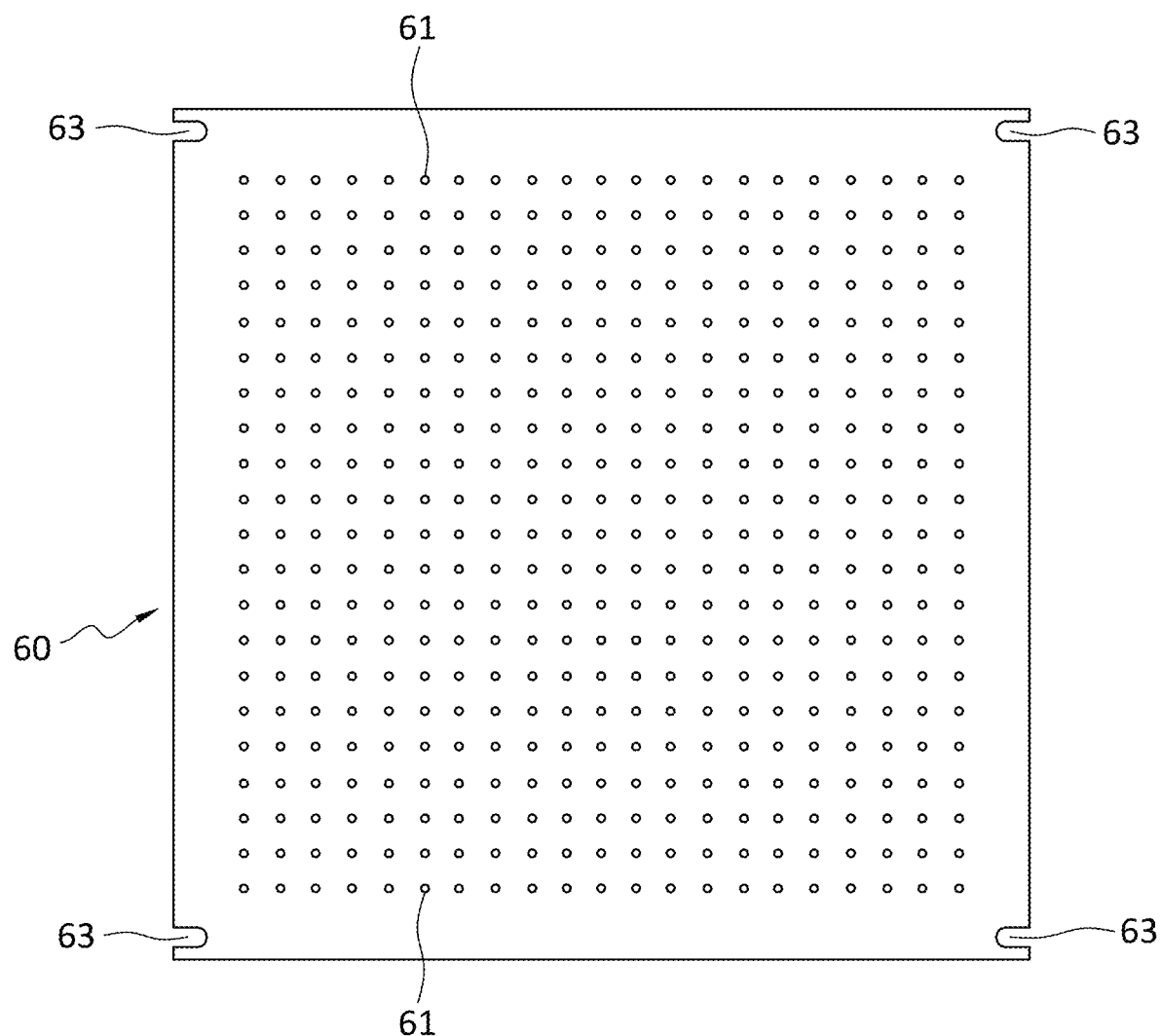
FIG. 12 is a plan view of a preferred back pressure plate for the primary or first mixing chamber.
Figure 13:
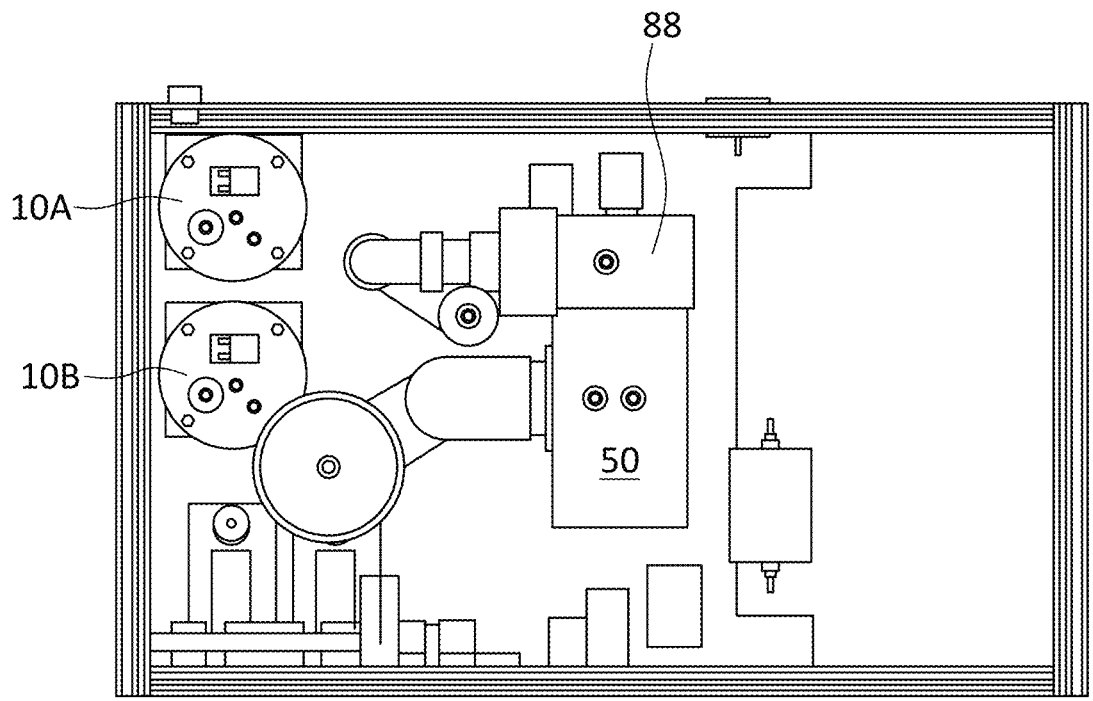
FIG. 13 is a plan view of portions of a preferred embodiment of a calibrated aerosol source with portions removed so that particular components can be readily viewed.
Figure 14:
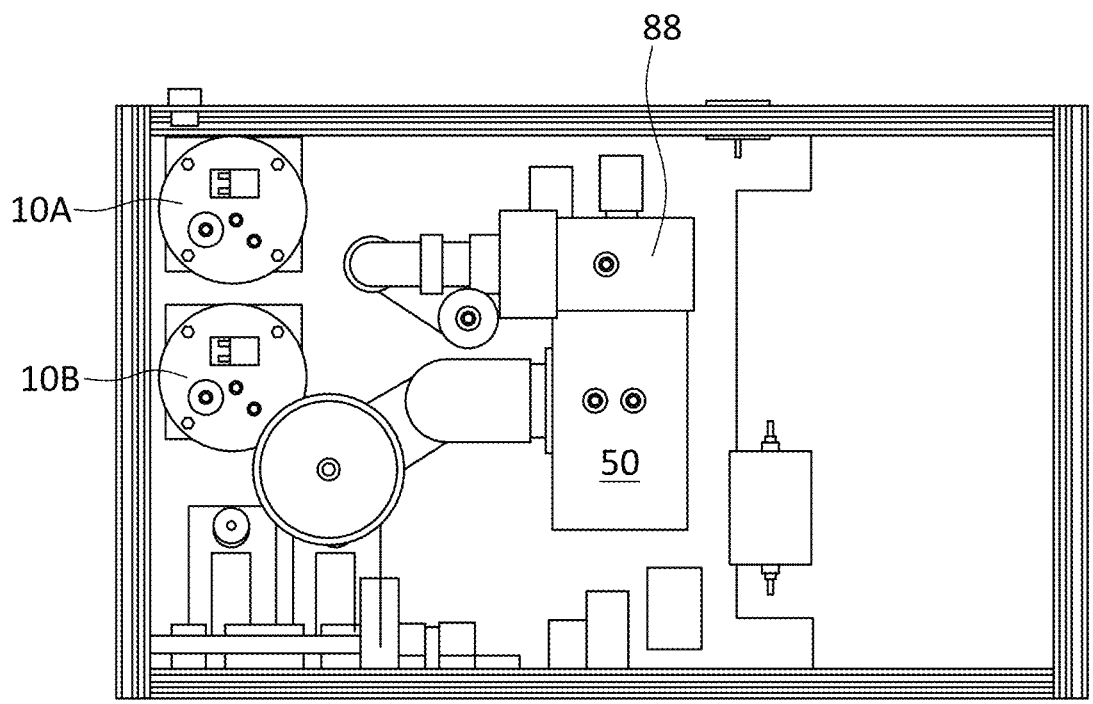
FIG. 14 is a plan view of portions of a preferred embodiment of a calibrated aerosol source with portions removed so that particular components can be readily viewed.

Referring to FIGS. 1, 10 and 12, primary mixing chamber 50 includes a back pressure plate 60 adjacent but spaced from fan filter unit 62. Fan filter unit 62 which is decoupled from mixing chamber 50 (i.e., the mixing chamber 50 does not directly contact or abut filter fan unit 62). Preferably, fan filter unit 62 includes a HEPA filter and a suction or vacuum pump to process excess aerosol (schematically shown by arrow C in FIG. 1) escaping from mixing chamber 50 to prevent aerosol from being released into the environment in which CAS A is being used.

A preferred form of back pressure plate 60 is depicted in FIG. 12. Back pressure plate 60 and the fan controller 44 are configured to create a positive pressure in primary mixing chamber 50 so that the aerosol test sample is directed out of mixing chamber 50 without any mechanical means including but not limited to a pump.

The back pressure plate 60 can be formed from any suitable material including but not limited to a metal or non-metallic member (e.g., acrylic material). The back pressure plate preferably includes a grid of a plurality of through openings (i.e., openings extending through the back pressure plate). A preferred back pressure plate for chamber 50 includes 441 through holes 61 in a grid form including twenty-one rows wherein each row includes twenty-one through holes. The back pressure plate can be a twelve-inch square having a thickness of 0.125 inches with the spacing of 0.5 inches (measured from a center of a through opening) between adjacent openings. Preferably, each opening has a diameter of 0.077 inches. Mounting grooves 63 can be provided in each of the corners to facilitate mounting of the back pressure plate 60. The configuration of back pressure plate 60 including but not limited to the number, sizing and arrangement of the through openings can be readily varied as desired.

The fan controller 44 and back pressure plate 60 are configured or designed so that the positive pressure in primary mixing chamber 50 is in the range of one to two inches of water column or 0.036 psi to 0.072 psi. Fan controller 44 preferably uses pulse width modulation to control the speed of fan 42. Flow direction arrow B in FIG. 1 shows the general direction of fluid flow through the main aerosol mixing branch. A flow meter can be used to precisely monitor air flow. The flow meter readings can be provided to a PLC or other component to be used to control the speed of fan 42 based on flow meter readings.

The primary, first or main mixing chamber 50 is connected to the secondary aerosol mixing branch through three on/off valves 70, 72 and 74. The secondary aerosol mixing branch includes metering valve 80, flowmeter 82, HEPA filter 84, conduit 86 and secondary mixing chamber 88.

Metering valve is connected to the air conditioning system previously described by a conduit connected to the outlet port 13 or 15 of connector 11 that is not connected to pressure controller 8. Hence, compressed air that has been conditioned by filters 4A, 4B and 4C and dryer 5 is directed through regulator 6, metering valve 80, flowmeter 82, filter 84, conduit 86 and into mixing chamber 88. Metering valve 80 and flowmeter 82 84 are used to control the amount of dilution air supplied to mixing chamber 88. Conduit 86 includes a mixing plate 90 (e.g., Stairmand disk). The mixing plate 90 is positioned above the point at which aerosol from mixing chamber 50 enters conduit 86.

Secondary mixing chamber 88 includes a sample tube 92, a sample port 94 and a back pressure plate 96. Back pressure plate 96, like back pressure plate 60, has a plurality of through openings arranged in a grid or other pattern. In a most preferred embodiment, the back pressure plate 96 is circular in shape to correspond to a preferred shape of mixing chamber 88. The back pressure plate 96, the metering valve 80 and flowmeter 82 are used to create a desired pressure (e.g., positive pressure similar to or the same as created in mixing chamber 50) in mixing chamber 88.

Fan filter unit 62 is decoupled from mixing chamber 88 (i.e., the mixing chamber 88 does not directly contact or abut filter fan unit 62). Fan filter unit 62 processes excess aerosol (schematically shown by arrow D in FIG. 1) escaping from mixing chamber 88 to prevent aerosol from being released into the environment in which CAS A is being used. Flow directional arrow E in FIG. 1 illustrates the general direction of flow through the corresponding portion of the secondary aerosol mixing branch.

Figure 5:
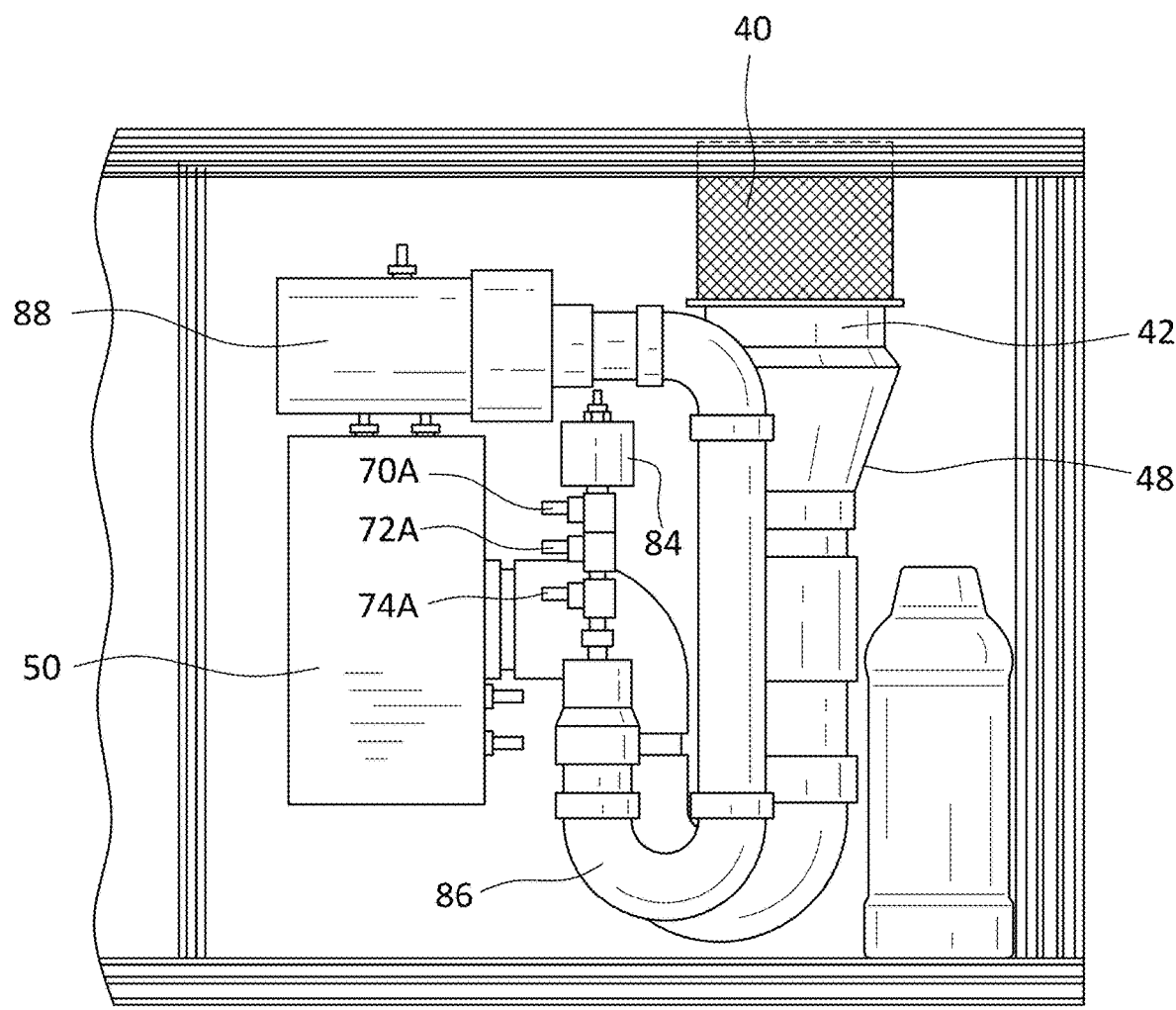
FIG. 5 is an elevational view of portions of a preferred embodiment of a calibrated aerosol source with portions removed so that particular components can be readily viewed.
Figure 6:
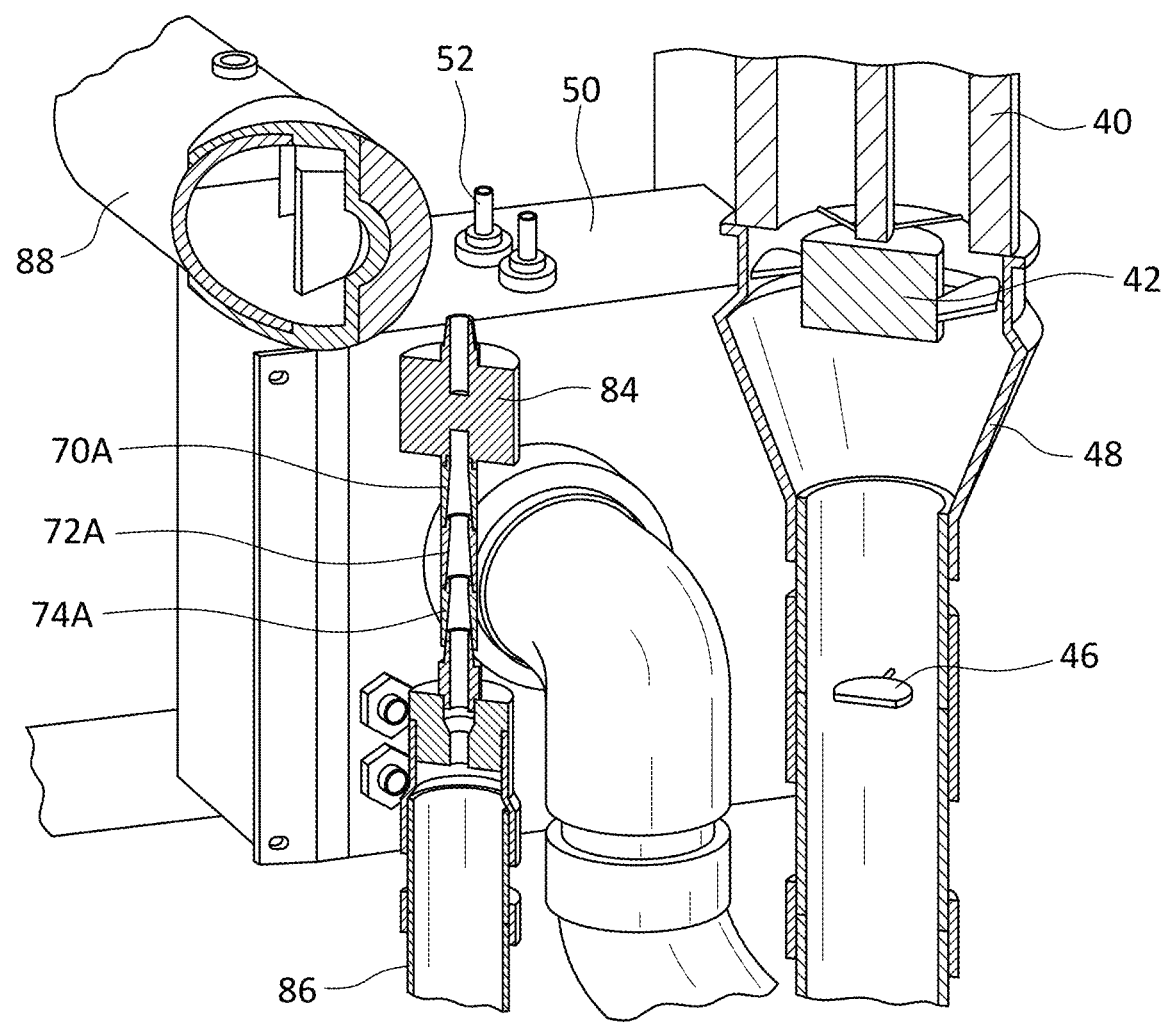
FIG. 6 is a fragmentary perspective view of portions of a preferred embodiment of a calibrated aerosol source with portions removed so that particular components can be readily viewed.
Figure 7:
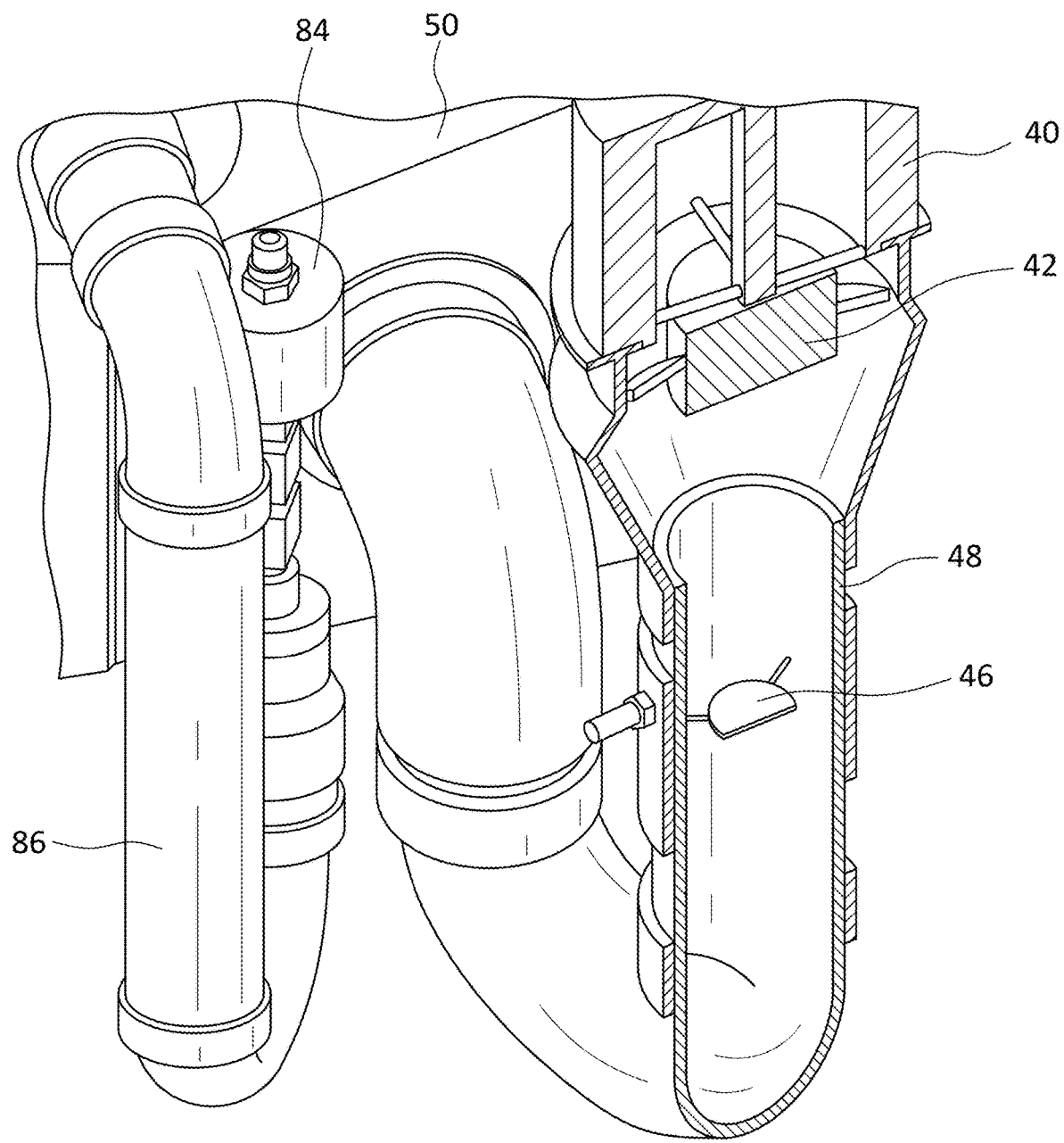
FIG. 7 is a fragmentary perspective view of portions of a preferred embodiment of a calibrated aerosol source with portions removed so that particular components can be readily viewed.

Referring to FIGS. 5 and 6, T-connectors 70A, 72A and 74A are stacked and vertically aligned directly below HEPA filter 84 so that dilution air passing through HEPA filter 84 can pass successively through T-connectors 70A, 72A and 74A and conduit 86 to enter mixing chamber 88 even when one or more of the valves 70, 72 and 74 are closed. Each of the valves 70, 72 and 74 has an inlet port connected by a conduit (not shown) to a corresponding outlet port of mixing chamber 50 to receive aerosol from mixing chamber 50 when the valve is open. Each of the valves 70, 72 and 74 has an outlet port connected by a conduit (not shown) to a horizontally extending inlet port of the corresponding T-connectors 70A, 72A and 74A. When a valve is closed, aerosol from mixing chamber 50 cannot enter the valve but dilution air can still pass through the corresponding T-connector connected to the closed valve so that dilution air will still enter mixing chamber 88.

Three valves are used to vary the micrograms/liter of aerosol entering mixing chamber 88. Where only one of the three valves is open, aerosol at a first range of 0.1 to 5 micrograms per liter can be supplied to mixing chamber 88. Where two valves are open, a second range of 5 to 30 micrograms per liter can be supplied to mixing chamber 88. Where all three valves are open, a third range of 30 to 60 micrograms per liter can be supplied to mixing chamber 88. The amount of aerosol per liter in each of the first, second and third ranges is varied from the lower limit to the upper limit by controlling the amount of dilution air directed through the valves.

Figure 15:
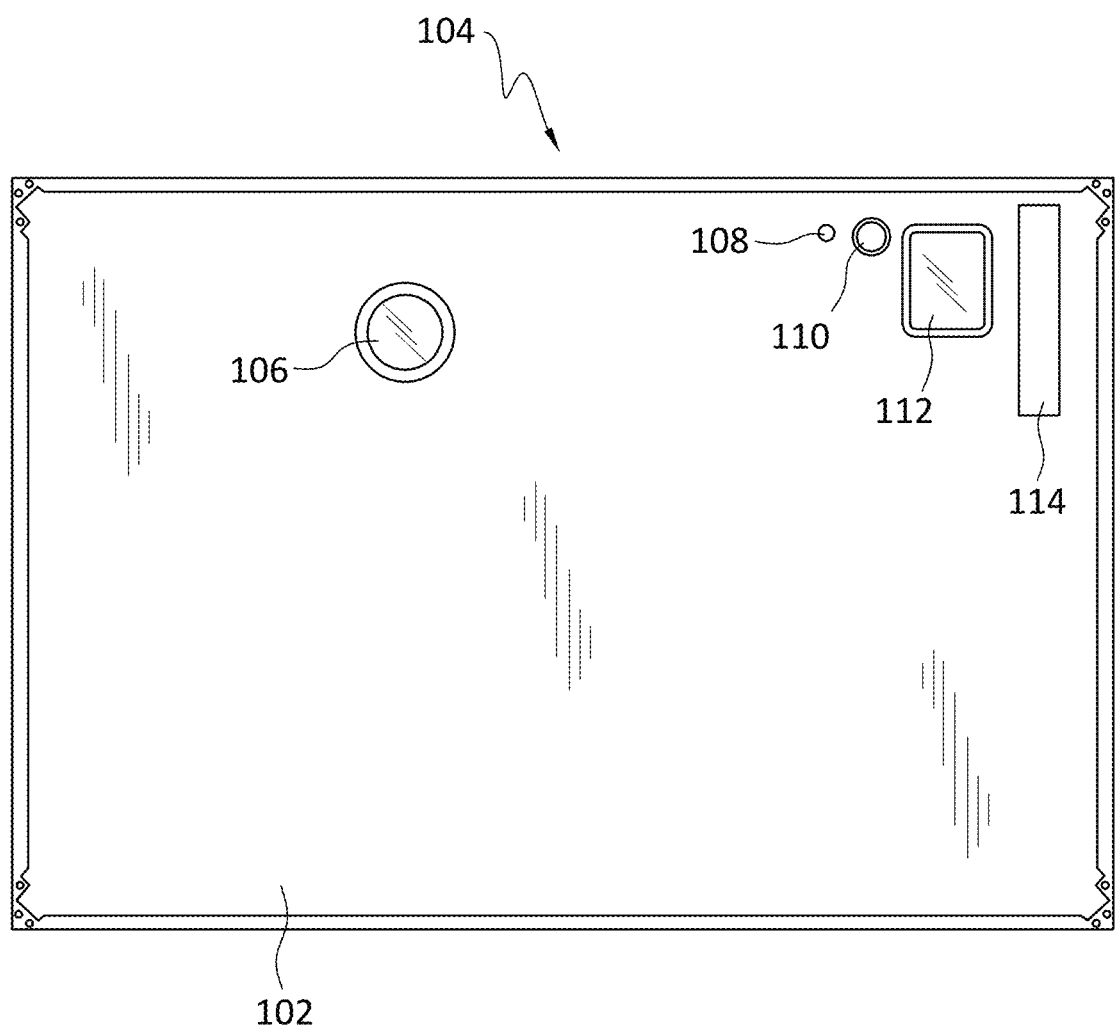
FIG. 15 is an elevational view of a preferred panel of a housing of a preferred embodiment of a calibrated aerosol source.

Referring to FIG. 15, a panel or face 102 of housing 104 housing the above-described components of CAS A includes fan filter unit differential pressure gauge 106, power on/off indicator 108, main aerosol mixing branch fan control 110, pressure controller remote display 112 and secondary aerosol mixing branch flow control/indicator 114. The secondary aerosol mixing branch flow control/indicator 114 is a component that includes both metering valve 80 and flowmeter 82.

Referring to FIG. 2, CAS A includes a power entry module 120, an AC/DC converter 122, valve relays 124 for controlling the state (open or on/closed or off) of valves 70, 72 and 74, generator on/off valves 126 and 128 for controlling a corresponding aerosol generator 10A and 10B, PLC 130 and fan controller 44. PLC 130 is a computer component that causes CAS A to operate in the manner described herein.

CAS A is preferably calibrated using a gravimetric measurement process which is a standard method for measuring aerosol particles, as it directly measures their mass. The tools required to perform a gravimetric measurement are a high accuracy microbalance, a flow meter, a timer, a vacuum pump and a high efficiency glass fiber filter.

The initial filter mass is measured prior to the test using the microbalance. The filter is then placed into a holder with one port connected to the sample port of either mixing chamber 50 or 88 depending on which aerosol concentration is to be measured and the other to the vacuum pump. Aerosol laden air is then drawn through the filter for a precise amount of time (t) using the vacuum pump at a predetermined flow rate (Q). The total volume of air passing through the filter (V) can be calculated using the formula $V=Q \cdot t$.

At the end of the test, the filter is removed from the holder and its mass is measured again. By subtracting the initial mass of the filter from the final mass of the filter, one can determine the mass of aerosol captured during the test (M). The concentration of aerosol in the air (C) can then be calculated by knowing the mass of aerosol captured (M) and the volume of aerosol that has passed through the filter (V) by using the following formula: $C=M/V$. This method is often referred to as a "gravimetric" measurement of an aerosol concentration.

To calibrate a photometer, the concentration of the aerosol in the mixing chamber 50 has to be adjusted and gravimetrically measured to be 100 μg/L. The instrument to be calibrated is then connected to the sample port of mixing chamber 50 and the calibration procedure of the photometer can be performed. For instruments (e.g., photometers) requiring a lower aerosol concentration, the procedure described above can be applied to mixing chamber 88 and the concentration adjusted to the desired value.

Any of the filters referred to above can be varied as desired, i.e., the filters can be HEPA filters, ULPA filters or other filters or a filter less efficient than HEPA or ULPA filters.

The forgoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. The claims are not limited to the preferred embodiments and have been written to preclude such a narrow construction using the principles of claim differentiation.

I claim:

1. A method comprising the steps of:
   (a) providing a calibrated aerosol source for generating at least one test aerosol at a plurality of different aerosol concentrations, the calibrated aerosol source including at least one aerosol generator, a primary mixing chamber and a secondary mixing chamber, a first test port being operably connected to said primary mixing chamber, said first test port being configured such that an instrument or system to be evaluated can be connected to said first test port and a second test port being operably connected to said secondary mixing chamber, said second test port being configured such that an instrument or system to be evaluated can be connected to said second test port; and,
   (b) providing the calibrated aerosol source with at least one of the following:
      (i) a liquid flow control assembly configured to maintain a liquid level in the at least one aerosol generator at a predetermined height;
      (ii) a pressure controller configured for controlling pressure of compressed air supplied to said at least one aerosol generator; and,
      (iii) one or more back pressure plates configured for maintaining a positive pressure in one or both of said primary mixing chamber and said secondary mixing chamber.

2. The method of claim 1, including the further steps of:
   (a) providing the primary mixing chamber with a back pressure plate and operably connecting the primary mixing chamber to a filter, a fan and a fan controller; and,
   (b) controlling a speed of the fan using the fan controller and configuring said back pressure plate of said primary mixing chamber such that a predetermined positive pressure is created in the primary mixing chamber to direct aerosol in the primary mixing chamber to the secondary mixing chamber operably connected to the primary mixing chamber without a pump.

3. The method of claim 2, wherein:
(a) the predetermined positive pressure is within the range of 0.036 psi to 0.072 psi.

4. The method of claim 2, including the further step of:
(a) providing the calibrated aerosol source with a fan filter unit configured for processing excess aerosol from the primary mixing chamber and the secondary mixing chamber to prevent aerosol from being released into a surrounding environment.

5. The method of claim 4, wherein:
(a) the fan filter unit is decoupled or spaced from both the primary mixing chamber and the secondary mixing chamber so that an internal pressure of a corresponding mixing chamber is not affected by loading of one or more filters of the fan filter unit.

6. The method of claim 1, wherein:
(a) the at least one aerosol generator includes a Laskin nozzle having a vertically extending nozzle tube configured for receiving compressed air from a compressed air source and a collar disposed adjacent a lower end of said vertically extending nozzle tube, said vertically extending nozzle tube having a single opening in a sidewall that allows compressed air to escape into a liquid housed in the at least one aerosol generator and said collar has a single opening extending vertically through said collar.

7. The method of claim 1, including the further step of:
(a) providing a plurality of stacked and vertically aligned T-connectors and a plurality of on/off valves configured for connecting said secondary mixing chamber to said primary mixing chamber and connecting said secondary mixing chamber to a dilution air source, each of said plurality of stacked and vertically aligned T-connectors having a first inlet port and a second inlet port, said first inlet port is configured to receive aerosol from said primary mixing chamber when a corresponding on/off valve is on and block flow of aerosol from said primary mixing chamber when the corresponding on/off valve is off, said second inlet port is configured to allow a dilution air to pass through each of the plurality of stacked and vertically aligned T-connectors when the corresponding on/off valve is on and off.

8. The method of claim 7, wherein:
(a) said plurality of stacked and vertically aligned on/off valves are configured to provide a test aerosol to said second test port of said secondary mixing chamber having an aerosol concentration ranging from 0.1 μg/L to 60 μg/L.

9. The method of claim 8, including the further steps of:
(a) connecting at a first time a first photometer to said first test port to calibrate said first photometer; and,
(b) connecting at a second time a second photometer to said second test port to calibrate said second photometer wherein said first time is different from said second time.

10. An apparatus comprising:
(a) a calibrated aerosol source configured for generating at least one test aerosol at a plurality of different aerosol concentrations, the calibrated aerosol source including at least one aerosol generator, a primary mixing chamber and a secondary mixing chamber, a first test port being operably connected to said primary mixing chamber, said first test port being configured such that an instrument or system to be evaluated can be connected to said first test port and a second test port being operably connected to said secondary mixing chamber, said second test port being configured such that an instrument or system to be evaluated can be connected to said second test port; and,
(b) the calibrated aerosol source having at least one of the following:
  (i) a liquid flow control assembly configured to maintain a liquid level in the at least one aerosol generator at a predetermined height;
  (ii) a pressure controller configured for controlling pressure of compressed air supplied to said at least one aerosol generator; and,
  (iii) at least one of the primary mixing chamber and the secondary mixing chamber having a back pressure plate configured for maintaining a positive pressure in a corresponding mixing chamber.

11. The apparatus of claim 10, wherein:
(a) said primary mixing chamber is operably connected to a filter, a fan and a fan controller, said primary mixing chamber having a back pressure plate, wherein the fan controller and the back pressure plate are configured to create a predetermined positive pressure in the primary mixing chamber.

12. The apparatus as set forth in claim 11, wherein:
(a) the predetermined positive pressure is within the range of 0.036 psi to 0.072 psi.

13. The apparatus of claim 10, further including:
(a) a fan filter unit for processing excess aerosol from the primary mixing chamber and the secondary mixing chamber to prevent aerosol from being released into a surrounding environment.

14. The apparatus of claim 13, wherein:
(a) the fan filter unit is decoupled or spaced from both the primary mixing chamber and the secondary mixing chamber so that an internal pressure of a corresponding mixing chamber is not affected by loading of one or more filters of the fan filter unit.

15. The apparatus of claim 14, wherein:
(a) the fan filter unit includes at least one HEPA filter and a vacuum pump.

16. The apparatus of claim 10, further including:
(a) a liquid flow control assembly configured to maintain a liquid level in the at least one aerosol generator at one inch above an upper surface of an annular collar of a Laskin nozzle, said liquid flow control assembly including at least one liquid level sensor for sensing a liquid level in the at least one aerosol generator, a liquid reservoir and a pump operably connected to the liquid reservoir and the at least one aerosol generator.

17. The apparatus of claim 16, wherein:
(a) the Laskin nozzle has a vertically extending nozzle tube configured for receiving compressed air from a compressed air source and a collar disposed adjacent a lower end of said vertically extending nozzle tube, said vertically extending nozzle tube has a single opening in a sidewall that allows compressed air to escape into a liquid housed in the at least one aerosol generator and said collar has a single opening extending vertically through said collar.

18. An apparatus comprising:
(a) a calibrated aerosol source configured for generating at least one test aerosol at a plurality of different aerosol concentrations, the calibrated aerosol source including at least one aerosol generator, a primary mixing chamber and a secondary mixing chamber, a first test port being operably connected to said primary mixing chamber, said first test port being configured such that an instrument or system to be evaluated can be connected to said first test port and a second test port being operably connected to said secondary mixing chamber, said second test port being configured such that an instrument or system to be evaluated can be connected to said second test port; and, (b) the calibrated aerosol test source having each of the following:

(i) a liquid flow control assembly configured to maintain a liquid level in the at least one aerosol generator at one inch above an upper surface of an annular collar of a Laskin nozzle;

(ii) a pressure controller configured for controlling pressure of compressed air supplied to said at least one aerosol generator so that when using Poly Alfa Olefin (PAO) compressed air pressure is maintained at 23 psi and when using Dioctyl Phthalate (DOP) compressed air pressure is maintained at 20 psi; and, (iii) at least one of the primary mixing chamber and the secondary mixing chamber having a back pressure plate for maintaining a positive pressure in a corresponding mixing chamber.

19. The apparatus of claim 18, further including:

(a) a PAO aerosol generator and a DOP aerosol generator.

20. The apparatus of claim 19, further including:

(a) a fan filter unit for processing excess aerosol from the primary mixing chamber and the secondary mixing chamber to prevent aerosol from being released into a surrounding environment, the fan filter unit is decoupled or spaced from both the primary mixing chamber and the secondary mixing chamber so that an internal pressure of a corresponding mixing chamber is not affected by loading of one or more filters of the fan filter unit and the fan filter includes at least one HEPA filter and means for drawing excess aerosol to and through the at least one HEPA filter.

* * * * *